(12) United States Patent
Lee et al.

(10) Patent No.: US 11,887,790 B2
(45) Date of Patent: Jan. 30, 2024

(54) MULTILAYER CAPACITOR AND BOARD HAVING THE SAME

(71) Applicant: SAMSUNG ELECTRO-MECHANICS CO., LTD., Suwon-si (KR)

(72) Inventors: Su Hyoung Lee, Suwon-si (KR); Seung Jun Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 117 days.

(21) Appl. No.: 17/496,657

(22) Filed: Oct. 7, 2021

(65) Prior Publication Data
US 2022/0148813 A1 May 12, 2022

(30) Foreign Application Priority Data
Nov. 10, 2020 (KR) .................. 10-2020-0149552

(51) Int. Cl.
| | |
|---|---|
| *H01G 4/30* | (2006.01) |
| *H01G 4/012* | (2006.01) |
| *H01G 4/232* | (2006.01) |
| *H01G 2/06* | (2006.01) |
| *H01G 4/008* | (2006.01) |
| *H01G 4/12* | (2006.01) |

(52) U.S. Cl.
CPC .............. *H01G 4/30* (2013.01); *H01G 2/065* (2013.01); *H01G 4/008* (2013.01); *H01G 4/012* (2013.01); *H01G 4/1218* (2013.01); *H01G 4/232* (2013.01)

(58) Field of Classification Search
CPC .......... H01G 4/30; H01G 2/065; H01G 4/008; H01G 4/012; H01G 4/1218; H01G 4/232
See application file for complete search history.

(56) References Cited

U.S. PATENT DOCUMENTS

| | | | |
|---|---|---|---|
| 2009/0284897 A1* | 11/2009 | Itamura | H01G 4/232 29/25.42 |
| 2012/0147516 A1 | 6/2012 | Kim et al. | |
| 2014/0151101 A1* | 6/2014 | Lee | H01G 4/12 156/89.12 |
| 2016/0093438 A1* | 3/2016 | Sasabayashi | H01G 4/12 361/301.4 |
| 2016/0372255 A1* | 12/2016 | Maki | H01F 17/0033 |

(Continued)

FOREIGN PATENT DOCUMENTS

| | | |
|---|---|---|
| JP | 2001-044066 A | 2/2001 |
| KR | 10-1141457 B1 | 5/2012 |

*Primary Examiner* — Michael P McFadden
(74) *Attorney, Agent, or Firm* — Morgan, Lewis & Bockius LLP

(57) ABSTRACT

A multilayer capacitor includes: a capacitor body including dielectric layers and first and second internal electrodes, and having first to six surfaces; first and second side portions disposed on the fifth and sixth surfaces of the capacitor body, respectively, and having roughnesses on surfaces thereof; a first external electrode disposed on the third surface of the capacitor body and parts of the first and second side portions and connected to the first internal electrodes; and a second external electrode disposed on the fourth surface of the capacitor body and parts of the first and second side portions and connected to the second internal electrodes.

16 Claims, 5 Drawing Sheets
(2 of 5 Drawing Sheet(s) Filed in Color)

(56) References Cited

U.S. PATENT DOCUMENTS

2017/0098506 A1* 4/2017 Ando ................ H01G 4/228
2017/0330688 A1* 11/2017 Lim ................ H01G 4/306
2017/0345564 A1* 11/2017 Ryu ................ H01G 4/2325
2019/0318872 A1* 10/2019 Mizuno ............ H01G 4/012

* cited by examiner

II-II'

III-III'

MULTILAYER CAPACITOR AND BOARD HAVING THE SAME

CROSS-REFERENCE TO RELATED APPLICATION(S)

This application claims benefit of priority to Korean Patent Application No. 10-2020-0149552 filed on Nov. 10, 2020 in the Korean Intellectual Property Office, the disclosure of which is incorporated herein by reference in its entirety.

TECHNICAL FIELD

The present disclosure relates to a multilayer capacitor and a board having the same.

BACKGROUND

Recently, in accordance with miniaturization and multi-functionalization of electronic devices, multilayer capacitors have also been required to have a small size and high capacitance. To this end, a multilayer capacitor having a structure in which an area of internal electrodes in a width direction is significantly increased by exposing the internal electrodes in a width direction of a capacitor body has been manufactured.

In the multilayer capacitor having such a structure, after the capacitor body is manufactured and before the capacitor body is sintered, side portions are separately attached to opposite surfaces of the capacitor body in the width direction to cover the exposed portions of the internal electrodes.

However, in the multilayer capacitor having a structure in which the side portions are attached to the opposite surfaces of the capacitor body in the width direction after the internal electrodes are exposed in the width direction of the capacitor body as described above, a phenomenon in which external electrodes are delaminated from the side portions at the time of performing firing after forming the external electrodes may occur, and moisture may permeate into a gap generated due to such a phenomenon to cause a defect.

SUMMARY

An aspect of the present disclosure may provide a multilayer capacitor of which capacitance may be increased and moisture resistance reliability may be improved by increasing adhesive force between external electrodes and side portions, and a board having the same.

According to an aspect of the present disclosure, a multilayer capacitor may include: a capacitor body including dielectric layers and first and second internal electrodes, and having first and second surfaces opposing each other, third and fourth surfaces connected to the first and second surfaces and opposing each other, and fifth and sixth surfaces connected to the first and second surfaces, connected to the third and fourth surfaces, and opposing each other; first and second side portions disposed on the fifth and sixth surfaces of the capacitor body, respectively, and having roughnesses on surfaces thereof; and a first external electrode disposed on the third surface of the capacitor body and portions of the first and second side portions and connected to the first internal electrodes, and a second external electrode disposed on the fourth surface of the capacitor body and portions of the first and second side portions and connected to the second internal electrodes.

The first and second side portions may have the roughnesses on surfaces thereof in contact with the first and second external electrodes, respectively.

The first and second side portions may have the roughnesses on portions thereof in contact with the first and second external electrodes, respectively.

The roughness (Ra) of one of surfaces of the first and second side portions may be 2 to 100 nm.

The first external electrode may include a first connection portion disposed on the third surface of the capacitor body, and connected to the first internal electrode; and a first band portion extending from the first connection portion to parts of the first and second side portions. The second external electrode may include a second connection portion disposed on the fourth surface of the capacitor body, and connected to the second internal electrode; and a second band portion extending from the second connection portion to parts of the first and second side portions.

The first and second band portions may have an average thickness of 10 μm or less, respectively.

The first and second side portions may have an average thickness of 10 μm or less, respectively.

The capacitor body may include an active region in which the first and second internal electrodes overlap each other and upper and lower cover regions disposed on upper and lower surfaces of the active region, respectively.

Each of the first and second external electrodes may include a plating layer.

According to another aspect of the present disclosure, a board having a multilayer capacitor may include: a circuit board having first and second electrode pads disposed on one surface thereof; and the multilayer capacitor as described above mounted on the circuit board so that the first and second external electrodes are connected to the first and second electrode pads, respectively.

According to another aspect of the present disclosure, a multilayer capacitor may include: a body including a ceramic body, in which dielectric layers and first and second internal electrodes are stacked, the body having first and second surfaces opposing each other in a stacking direction of the first and second internal electrodes, third and fourth surfaces from which the first and second internal electrode are respectively exposed, and fifth and sixth surfaces opposing each other; a first external electrode disposed on the third surface of the body and parts of the fifth and sixth surfaces, and connected to the first internal electrodes; and a second external electrode disposed on the fourth surface of the body and parts of the fifth and sixth surfaces, and connected to the second internal electrodes. A roughness of one of the fifth and sixth surfaces is greater than a roughness of one of the first and second surfaces.

One of the first and second external electrodes may include a band portion covers a portion of the one of the fifth and sixth surfaces having the roughness.

The band portion may have an average thickness of 10 μm or less.

The roughness (Ra) of the one of the fifth and sixth surfaces may be 2 to 100 nm.

The body may further include first and second side portions respectively disposed on opposing surfaces of the ceramic body, and an outer surface of one of the first and second side portions may be the one of the fifth and sixth surfaces.

One of the first and second side portions may have an average thickness of 10 μm or less.

BRIEF DESCRIPTION OF DRAWINGS

The patent or patent application file contains at least one drawing executed in color. Copies of this patent or patent application publication with color drawing(s) will be provided by the Office upon request and payment of the necessary fee.

The above and other aspects, features, and advantages of the present disclosure will be more clearly understood from the following detailed description taken in conjunction with the accompanying drawings, in which.

DETAILED DESCRIPTION

Figure 1:
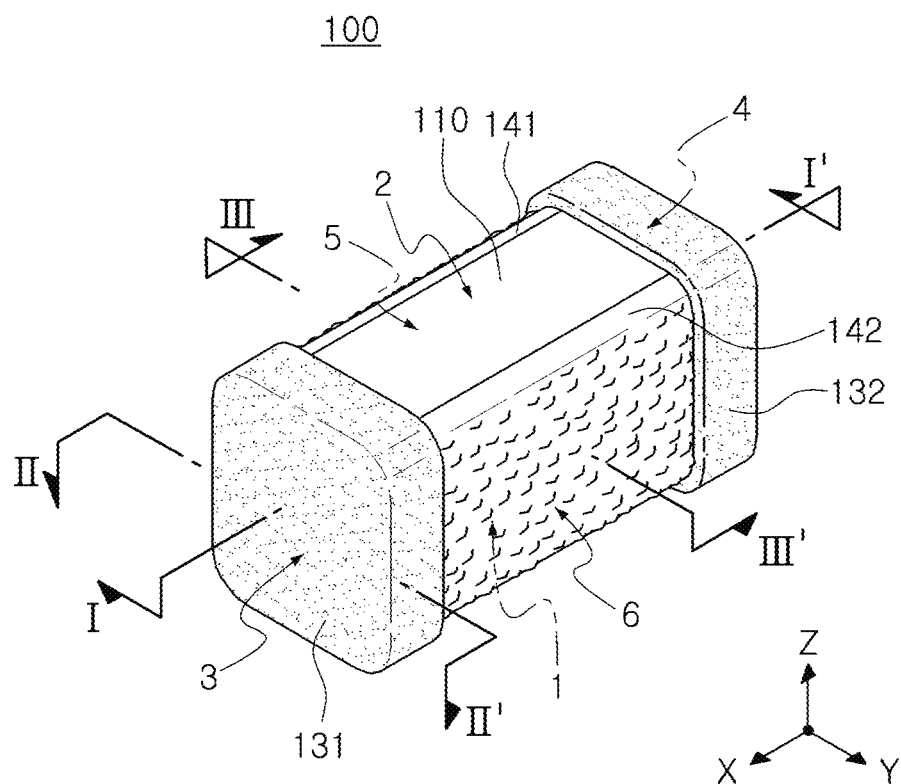
FIG. 1 is a perspective view illustrating a multilayer capacitor according to an exemplary embodiment in the present disclosure.

Hereinafter, exemplary embodiments of the present disclosure will now be described in detail with reference to the accompanying drawings.

Directions will be defined in order to clearly describe exemplary embodiments in the present disclosure. X, Y and Z in the drawings refer to a length direction, a width direction, and a thickness direction of a multilayer capacitor, respectively.

Here, the Z direction may be used as the same concept as a stacked direction in which dielectric layers are stacked in the present exemplary embodiment.

Figure 2:
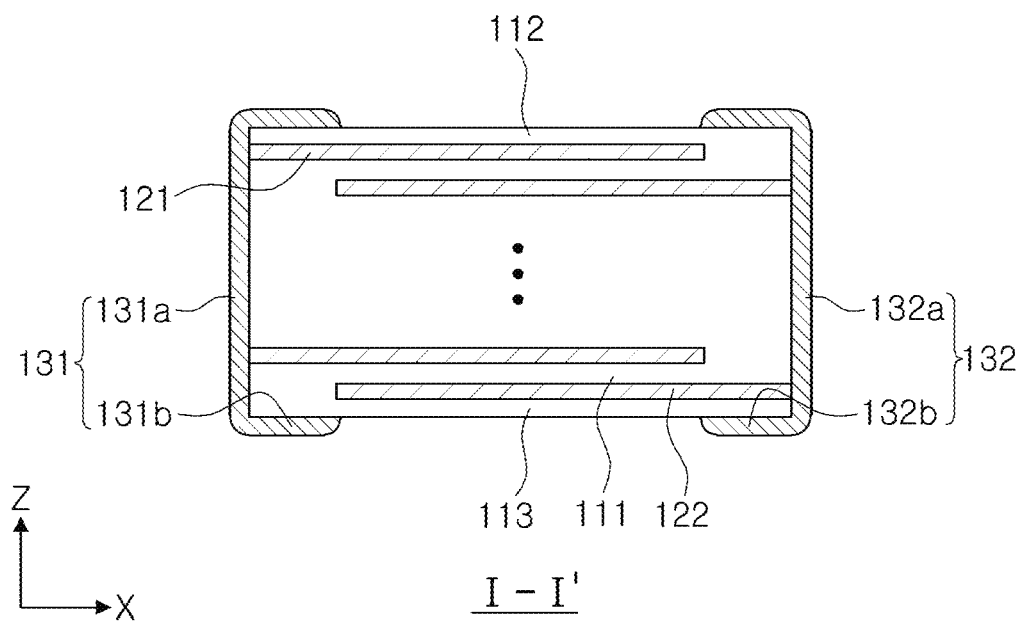
FIG. 2 is a cross-sectional view taken along line I-I' of FIG. 1.
Figure 3A:
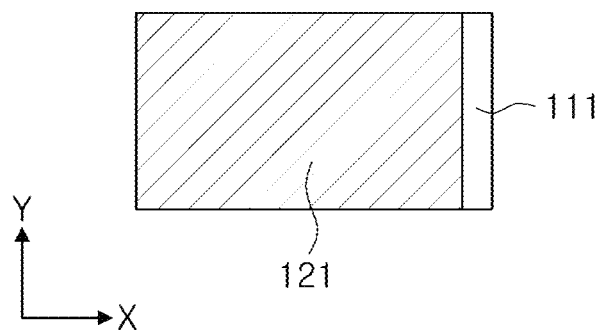
FIGS. 3A and 3B are plan views illustrating, respectively, stacked structures of first and second internal electrodes of the multilayer capacitor of FIG. 1.
Figure 3B:
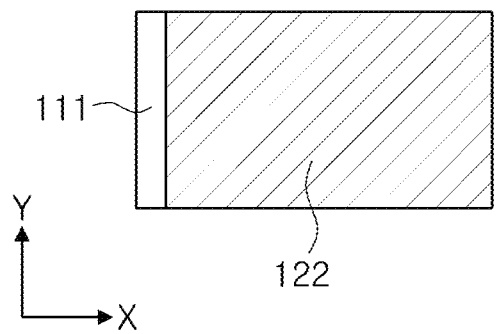
Figure 4:
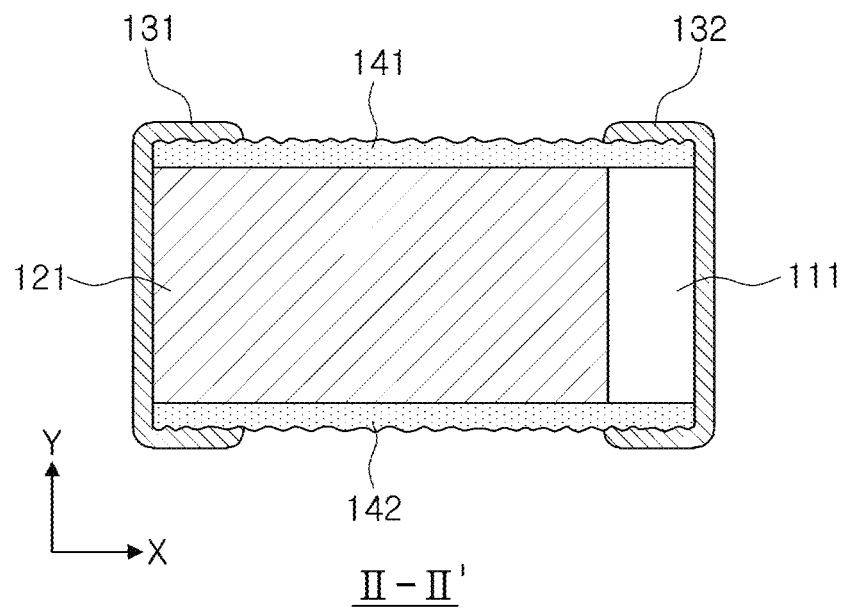
FIG. 4 is a cross-sectional view taken along line II-II' of FIG. 1.
Figure 5:
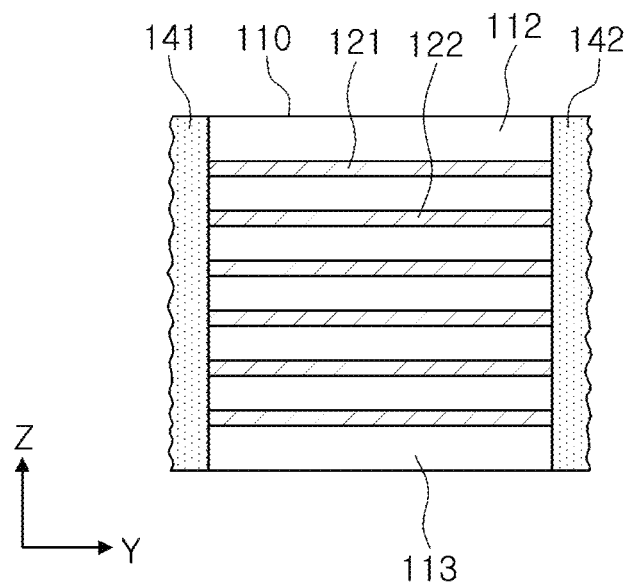
FIG. 5 is a cross-sectional view taken along line III-III' of FIG. 1.

FIG. 1 is a perspective view illustrating a multilayer capacitor according to an exemplary embodiment in the present disclosure, FIG. 2 is a cross-sectional view taken along line I-I' of FIG. 1, FIGS. 3A and 3B are plan views illustrating, respectively, stacked structures of first and second internal electrodes of the multilayer capacitor of FIG. 1, FIG. 4 is a cross-sectional view taken along line II-II' of FIG. 1, and FIG. 5 is a cross-sectional view taken along line III-III' of FIG. 1.

Hereinafter, a multilayer capacitor according to the present exemplary embodiment will be described with reference to FIGS. 1 through 5.

Referring to FIGS. 1 through 5, a multilayer capacitor 100 according to the present exemplary embodiment may include a capacitor body 110, first and second side portions 141 and 142, and first and second external electrodes 131 and 132.

The capacitor body 110 may be formed by stacking and then sintering a plurality of dielectric layers 111 in the Z direction, and adjacent dielectric layers 111 of the capacitor body 110 may be integrated with each other so that boundaries therebetween are not readily apparent without using a scanning electron microscope (SEM).

In addition, the capacitor body 110 may include the plurality of dielectric layers 111 and first and second internal electrodes 121 and 122 alternately disposed in the Z direction with each of the dielectric layers 111 interposed therebetween and having different polarities.

In addition, the capacitor body 110 may include an active region which contributes to forming capacitance of the multilayer capacitor and in which the first and second internal electrodes are alternately disposed in the Z direction with each of the dielectric layers 111 interposed therebetween and upper and lower cover regions 112 and 113 provided as margin portions on upper and lower surfaces of the active region in the Z direction, respectively.

In addition, a shape of the capacitor body 110 is not particularly limited, but may be a hexahedral shape, and the capacitor body 110 may have first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first and second surfaces 1 and 2, connected to the third and fourth surfaces 3 and 4, and opposing each other. In this case, in the present exemplary embodiment, the first surface 1 may be a mounted surface of the multilayer capacitor 100.

The dielectric layer 111 may include ceramic powders such as $BaTiO_3$-based ceramic powders or the like.

In addition, the $BaTiO_3$-based ceramic powders may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr or the like, is partially solid-dissolved in $BaTiO_3$, but are not limited thereto.

In addition, the dielectric layer 111 may further include a ceramic additive, an organic solvent, a plasticizer, a binder, a dispersant, and the like, in addition to the ceramic powders.

The ceramic additive may include, for example, a transition metal oxide or a transition metal carbide, a rare earth element, magnesium (Mg), aluminum (Al), or the like.

The first and second internal electrodes 121 and 122, which are electrodes having different polarities, may be formed on the respective dielectric layers 111 and be alternately stacked in the Z direction, and may be alternately disposed in the capacitor body 110 to face each other in the Z direction with each of the dielectric layers 111 interposed therebetween.

In this case, the first and second internal electrodes 121 and 122 may be electrically insulated from each other by each of the dielectric layers 111 disposed therebetween.

In addition, the first internal electrode 121 may be exposed through the third, fifth, and sixth surfaces 3, 5, and 6 of the capacitor body 110.

In this case, the first internal electrodes 121 may also be exposed through a corner connecting the third surface 3 and the fifth surface 5 of the capacitor body 110 to each other and a corner connecting the third surface 3 and the sixth surface 6 of the capacitor body 110 to each other.

The second internal electrode 122 may be exposed through the fourth, fifth, and sixth surfaces 4, 5, and 6 of the capacitor body 110.

In this case, the second internal electrodes 122 may also be exposed through a corner connecting the fourth surface 4 and the fifth surface 5 of the capacitor body 110 to each other and a corner connecting the fourth surface 4 and the sixth surface 6 of the capacitor body 110 to each other.

In this case, end portions of the first and second internal electrodes 121 and 122 alternately exposed through the third and fourth surfaces 3 and 4 of the capacitor body 110, respectively, may be electrically connected to first and second external electrodes 131 and 132 to be described below disposed on opposite end surfaces of the capacitor body 110 in the X direction, respectively.

According to the configuration as described above, when predetermined voltages are applied to the first and second external electrodes 131 and 132, electric charges may be accumulated between the first and second internal electrodes 121 and 122.

In this case, capacitance of the multilayer capacitor 100 may be in proportion to an area of the first and second internal electrodes 121 and 122 overlapping each other along the Z direction in the active region.

When the first and second internal electrodes 121 and 122 are configured as in the present exemplary embodiment, basic areas of the first and second internal electrodes 121 and 122 may be increased, but an area of the first and second internal electrodes 121 and 122 vertically overlapping each other may also be increased, and capacitance of the multilayer capacitor 100 may thus be increased.

That is, when an area of a region in which the first and second internal electrodes 121 and 122 overlap each other is significantly increased, capacitance may be significantly increased even in a multilayer capacitor having the same size.

In addition, an acceleration life of insulation resistance may be improved by decreasing steps due to the stacking of the internal electrodes, such that the multilayer capacitor 100 having excellent capacitance characteristics and improved reliability may be provided.

In this case, a material of each of the first and second internal electrodes 121 and 122 is not particularly limited, and may be a conductive paste formed of one or more of a noble metal material, or nickel (Ni) and copper (Cu).

A method of printing the conductive paste may be a screen printing method, a gravure printing method or the like, but is not limited thereto.

The first side portion 141 may be disposed on the fifth surface 5 of the capacitor body 110, and the second side portion 142 may be disposed on the sixth surface 6 of the capacitor body 110.

The first and second side portions 141 and 142 may be in contact with the fifth and sixth surfaces 5 and 6 of the capacitor body 110, respectively, to cover front ends of portions of the first and second internal electrodes 121 and 122 exposed through the fifth and sixth surfaces 5 and 6 of the capacitor body 110, respectively.

The first and second side portions 141 and 142 may serve to protect the capacitor body 110 and the first and second internal electrodes 121 and 122 from external impacts or the like and secure insulation properties and moisture resistance reliability around the capacitor body 110.

Figure 7:
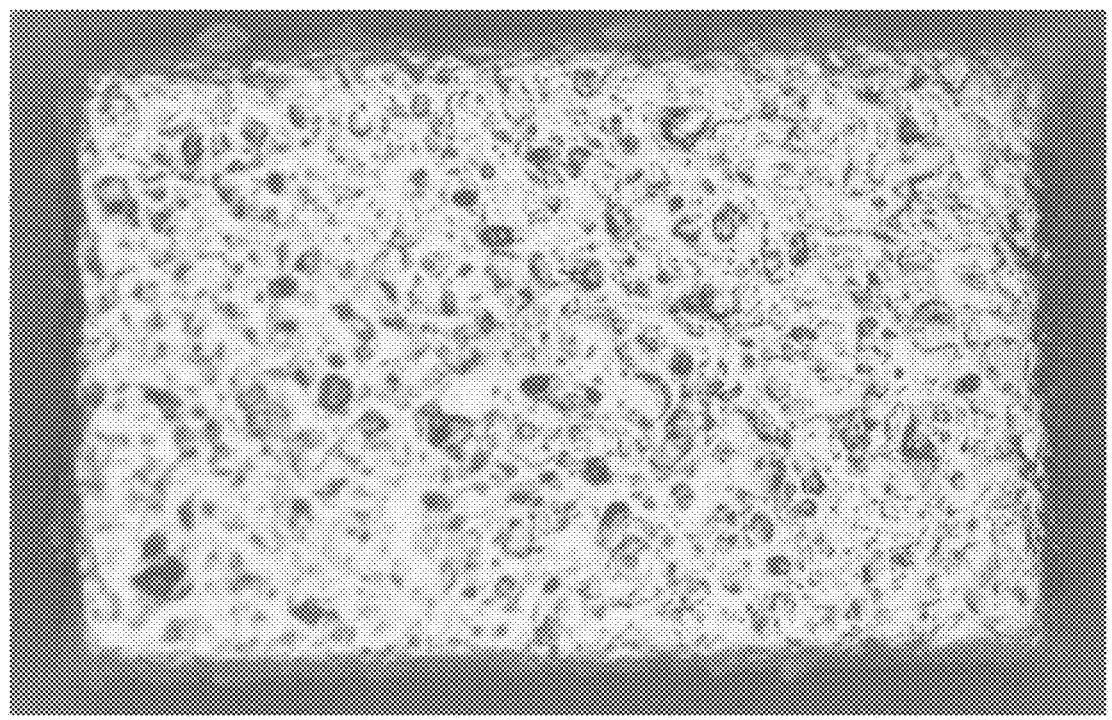
FIG. 7 is an enlarged photograph of a surface of a side portion in the multilayer capacitor according to an exemplary embodiment in the present disclosure.
Figure 8:
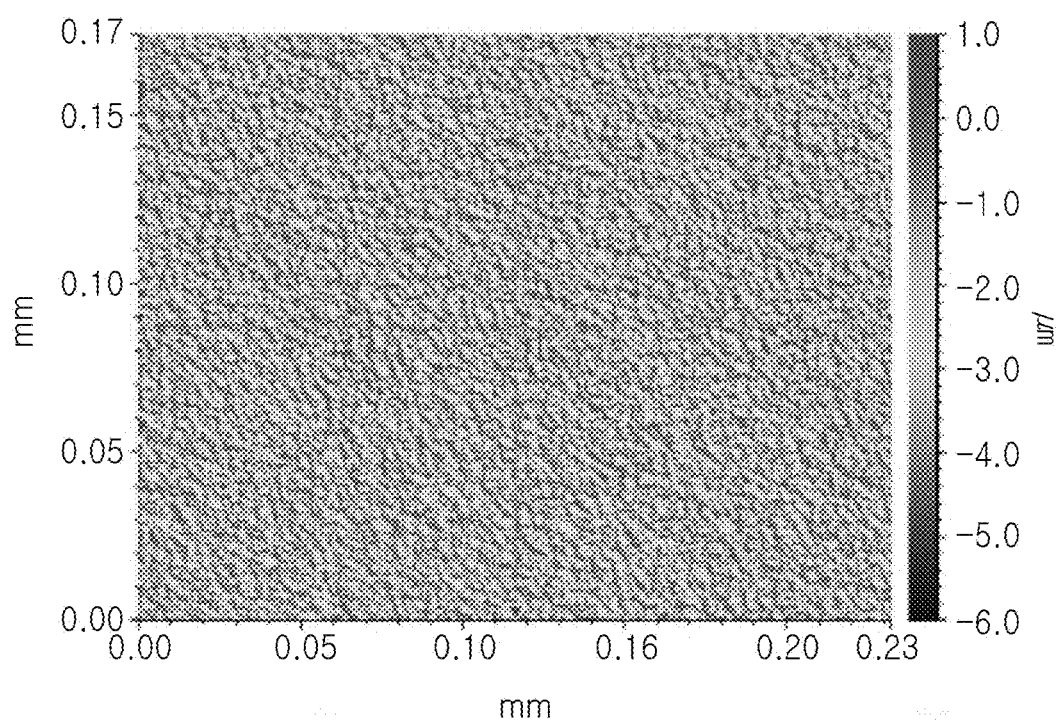
FIG. 8 is a photograph of the surface of the side portion before firing in the multilayer capacitor according to an exemplary embodiment in the present disclosure, taken using a 3D measuring device.
Figure 9:
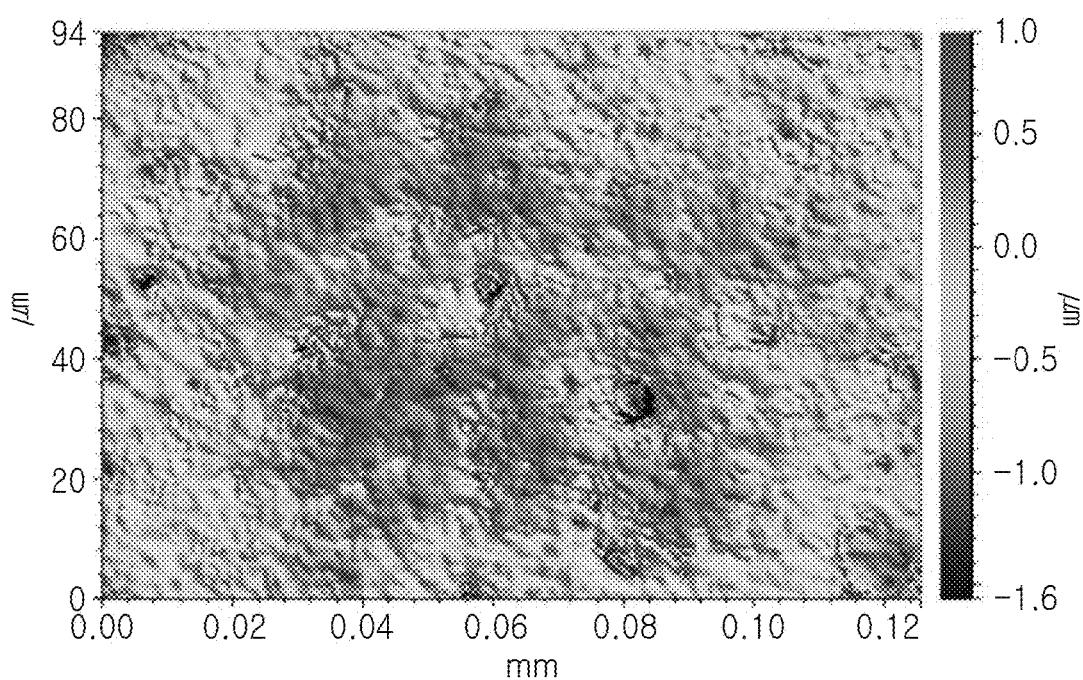
FIG. 9 is a photograph of the surface of the side portion after firing in the multilayer capacitor according to an exemplary embodiment in the present disclosure, taken using the 3D measuring device.

FIG. 7 is an enlarged photograph of a surface of a side portion in the multilayer capacitor according to an exemplary embodiment in the present disclosure, FIG. 8 is a photograph of the surface of the side portion before firing in the multilayer capacitor according to an exemplary embodiment in the present disclosure, taken using a 3D measuring device such as a three dimension coordinate measuring instrument, and FIG. 9 is a photograph of the surface of the side portion after firing in the multilayer capacitor according to an exemplary embodiment in the present disclosure, taken using the 3D measuring device.

As illustrated in FIGS. 7 through 9, the first and second side portions 141 and 142 may have roughnesses on surfaces thereof.

In this case, the first side portion 141 may be configured so that a surface thereof opposing a surface facing the sixth surface 6 of the capacitor body 110 in the Y direction has the roughness and the other surfaces thereof do not have the roughness.

That is, the first side portion 141 may have the roughness on a surface thereof in contact with the first external electrode 131 and/or the second external electrode 132. In this case, the first side portion 141 may have the roughness over the surface thereof in contact with the first external electrode 131 and/or the second external electrode 132, but may be configured to have the roughness on a portion thereof in contact with a first band portion 131b of the first external electrode 131 and/or a second band portion 132b of the second external electrode 132, if necessary.

The second side portion 142 may be configured so that a surface thereof opposing a surface facing the fifth surface 5 of the capacitor body 110 in the Y direction has the roughness and the other surfaces thereof do not have the roughness.

That is, the second side portion 142 may have the roughness on a surface thereof in contact with the second external electrode 132 and/or the first external electrode 131. In this case, the second side portion 142 may have the roughness over the surface thereof in contact with the second external electrode 132 and/or the first external electrode 131, but may be configured to have the roughness on a portion thereof in contact with a second band portion 132b of the second external electrode 132 and/or a first band portion 131b of the first external electrode 131, if necessary.

The first and second side portions 141 and 142 may be attached to the fifth and sixth surfaces 6 and 5 of the capacitor body 110, respectively, through thermocompression. In this case, the roughnesses may be formed on the surfaces of the first and second side portions 141 and 142 by attaching subsidiary materials having a pattern or a roughness to a mold used for the thermocompression to transfer parts of the subsidiary materials to the surfaces of the first and second side parts 141 and 142. However, in the present disclosure, a method of forming the roughness of the side portion is not limited thereto.

In one example, a roughness of outer surfaces of the first and second side portions 141 and 142 may be greater than a roughness of the first and second surfaces 1 and 2.

Voltages having different polarities may be provided to the first and second external electrodes 131 and 132, respectively, and the first and second external electrodes 131 and 132 may be disposed on the opposite end surfaces of the capacitor body 110 in the X direction, respectively, and may be electrically connected to portions of the first and second internal electrodes 121 and 122 exposed through the third and fourth surfaces 3 and 4 of the capacitor body 110, respectively.

The first external electrode 131 may include a first connection portion 131a and a first band portion 131b.

The first connection portion 131a may be disposed on the third surface 3 of the capacitor body 110, and may be in contact with the end portions of the first internal electrodes 121 externally exposed through the third surface 3 of the capacitor body 110 to serve to physically and electrically connect the first internal electrodes 121 and the first external electrode 131 to each other.

The first band portion 131b may extend from the first connection portion 131a to parts of the fifth and sixth surfaces 5 and 6 of the capacitor body 110 to cover one end portions of the first and second side portions 141 and 142.

In this case, the first band portion 131b may further extend to the first and second surfaces 1 and 2 of the capacitor body 110 in order to improve fixing strength or the like, if necessary.

The second external electrode 132 may include a second connection portion 132a and a second band portion 132b.

The second connection portion 132a may be disposed on the fourth surface 4 of the capacitor body 110, and may be in contact with the end portions of the second internal electrodes 122 externally exposed through the fourth surface 4 of the capacitor body 110 to serve to physically and electrically connect the second internal electrodes 122 and the second external electrode 132 to each other.

The second band portion 132b may extend from the second connection portion 132a to parts of the fifth and sixth surfaces 5 and 6 of the capacitor body 110 to cover the other end portions of the first and second side portions 141 and 142.

In this case, the second band portion 132b may further extend to the first and second surfaces 1 and 2 of the capacitor body 110 in order to improve fixing strength or the like, if necessary.

In addition, in the first and second external electrodes 131 and 132, the first and second band portions 131b and 132b may have an average thickness of 10 μm or less. An average thickness of a band portion may be obtained by measuring multiple points, for example, 5, 10, or 20, at a center portion of the band portion in an X-Z cross section or an X-Y cross section by using an SEM and by averaging the measured thicknesses. Other methods and/or tools appreciated by one of ordinary skill in the art, even if not described in the present disclosure, may also be used.

Further, the first and second side portions 141 and 142 may have an average thickness of 10 μm or less. An average thickness of a side portion may be obtained by measuring multiple points, for example, 5, 10, or 20, at a center portion of the side portion in an X-Y cross section by using an SEM and by averaging the measured thicknesses. Other methods and/or tools appreciated by one of ordinary skill in the art, even if not described in the present disclosure, may also be used.

When the external electrode or the side portion is thinned to increase an effective volume of a chip, a delamination bond between the external electrode and the side portion may increase due to stress at the time of performing firing and hardening, and such delamination may cause a moisture resistance reliability defect.

In the present exemplary embodiment, the surface of the side portion may have the roughness to improve adhesiveness between the side portion and the external electrode. Therefore, the multilayer capacitor 100 may be miniaturized while the effective volume of the chip is increased, a manufacturing process of the multilayer capacitor 100 may be simplified, and a manufacturing cost of the multilayer capacitor 100 may be decreased.

In addition, each of the first and second external electrodes 131 and 132 may include a plating layer in order to improve at least some of structural reliability, ease in mounting the multilayer capacitor on a board, durability and heat resistance against external sources, and equivalent series resistance (ESR).

In this case, the plating layer may be formed by sputtering or electric deposition, but is not limited thereto.

In addition, the plating layer may contain nickel most abundantly, but is not limited thereto, and may be formed of copper (Cu), palladium (Pd), platinum (Pt), gold (Au), silver (Ag), or lead (Pb), or alloys thereof.

In addition, the roughness (Ra) of each of the surfaces of the first and second side portions 141 and 142 may be 2 to 100 nm. In one example, the roughness (Ra) may refer to an arithmetic average roughness of a measured region.

When the roughness of each of the surfaces of the first and second side portions 141 and 142 is less than 2 nm, a defect may occur in a tape test for confirming a significant difference in adhesiveness of the external electrode, and a defect may also occur in a moisture resistance reliability evaluation.

When the roughness of each of the surfaces of the first and second side portions 141 and 142 exceeds 100 nm, it may be difficult to attach the first and second side portions 141 and 142 to the fifth and sixth surfaces 6 and 5 of the capacitor body 110, respectively, by a thermocompression process.

Table 1 shows values obtained by measuring roughnesses of side portions in multilayer capacitors using a 3D measuring device.

In Table 1, #1 to #5 were classified into a first group of multilayer capacitors in which a process of separately forming a roughness on the surface of the side portion is not performed, #6 to #10 were classified into a second group of multilayer capacitors configured to have a roughness of about 20 nm, #11 to #15 were classified into a third group of multilayer capacitors in which a roughness of about 20 nm is further increased from #6 to #10, and #16 to #20 were classified into a fourth group of multilayer capacitors in which a roughness of about 20 nm is further increased from #11 to #15.

TABLE 1

| # | Roughness (Ra) (nm) of Side Portion |
|---|---|
| 1 | 0.788 |
| 2 | 1.132 |
| 3 | 0.835 |
| 4 | 1.388 |
| 5 | 0.984 |
| 6 | 22.977 |
| 7 | 22.740 |
| 8 | 22.983 |
| 9 | 22.852 |
| 10 | 23.069 |
| 11 | 46.588 |
| 12 | 44.727 |
| 13 | 44.931 |
| 14 | 48.337 |
| 15 | 46.981 |
| 16 | 66.096 |
| 17 | 69.203 |
| 18 | 69.096 |
| 19 | 64.567 |
| 20 | 64.121 |

Here, multilayer capacitors used in an experiment had a length×width×thickness of 0.395 mm×0.211 mm×0.219 mm, a total number of stacked internal electrodes was 238, a thickness of a band portion of an external electrode was about 7 μm, and a thickness of a side portion was about 10 μm.

In addition, a tape test was performed on 20 samples in which roughnesses of the side portions are different from each other as shown in Table 1, adhesiveness between the external electrode and the side portion was confirmed, and the number of defective samples was shown in Table 2.

Here, Step 1 is a Ref, and represents results obtained by performing a tape test 800 gf five times on samples, Step 2 represents results obtained by performing a tape test 800 gf five times on the samples after the samples are immersed in water at 55° C. for ten minutes, Step 3 represents results obtained by performing a tape test 1600 gf five times on the samples, and Step 4 represents results obtained by performing a tape test 1600 gf five times on the samples. In this case, a test was performed ten times on each sample.

TABLE 2

| Division | Average Ra (nm) | Step 1 | Step 2 | Step 3 | Step 4 |
|---|---|---|---|---|---|
| First Group | 1.025 | 0/50 | 9/50 | 11/50 | 12/50 |
| Second Group | 22.924 | 0/50 | 5/50 | 7/50 | 7/50 |
| Third Group | 46.313 | 0/50 | 3/50 | 3/50 | 4/50 |
| Fourth Group | 59.015 | 0/50 | 1/50 | 2/50 | 3/50 |

It may be confirmed from Table 2 that a defect rate in adhesive force test is lower in the second to fourth groups in which the side portions have the roughnesses, than in the first group, which is a Comparative Example.

In addition, it may be confirmed that the defect rate becomes relatively lower when the roughness increases.

In the present exemplary embodiment, the roughness (Ra) of the surface of the side portion may be 2 to 100 nm, and more preferably, 2 to 70 nm.

Meanwhile, as a result of additionally performing a moisture resistance reliability test on the basis of contents of Table 1, a defect occurred in five of fifty samples in the first group, and a defect did not occur at all in the second to fourth groups.

Figure 6:
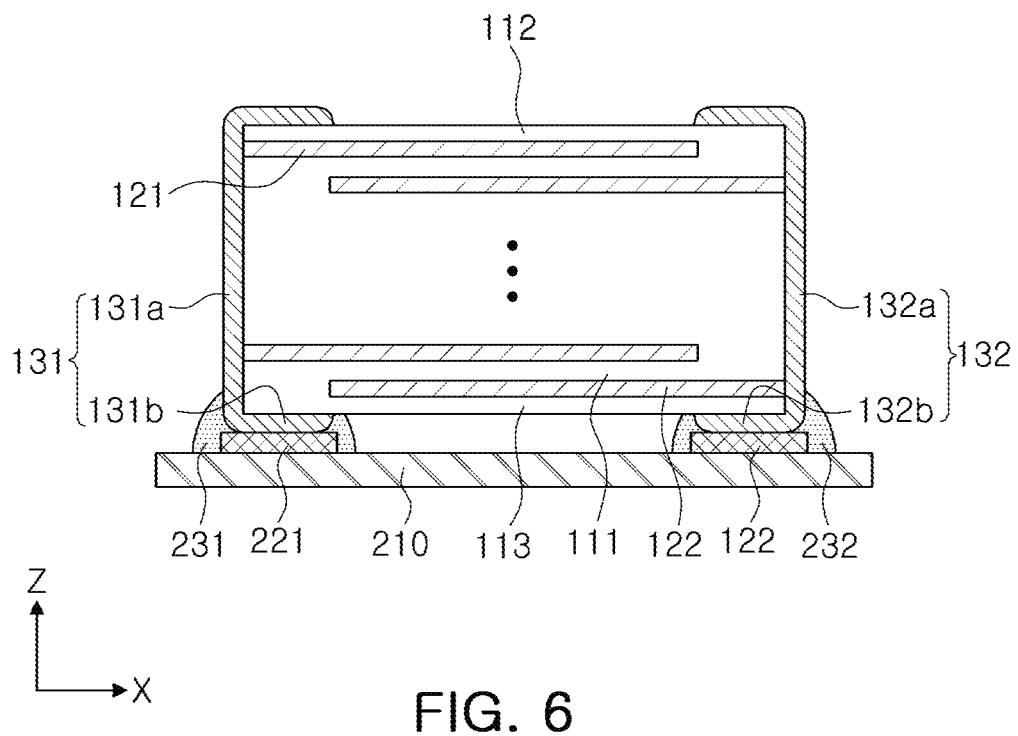
FIG. 6 is a cross-sectional view illustrating a board on which the multilayer capacitor of FIG. 1 is mounted.

Referring to FIG. 6, a board having a multilayer capacitor according to the present exemplary embodiment may include a circuit board 210 having first and second electrode pads 211 and 222 disposed on one surface thereof and the multilayer electronic capacitor 100 mounted on an upper surface of the circuit board 210 so that the first and second external electrodes 131 and 141 thereof are connected to the first and second electrode pads 221 and 222, respectively.

It has been illustrated and described in the present exemplary embodiment that the multilayer capacitor 100 is mounted on the circuit board 210 by solders 231 and 232, but conductive pastes may be used instead of the solders, if necessary.

As set forth above, according to an exemplary embodiment in the present disclosure, capacitance of the multilayer capacitor may be increased by extending the internal electrodes so that the internal electrodes are exposed in the width direction of the capacitor body, and moisture resistance reliability of the multilayer capacitor may be improved by increasing adhesive strength between the external electrodes and the side portions.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a capacitor body including dielectric layers and first and second internal electrodes, and having first and second surfaces opposing each other, third and fourth surfaces connected to the first and second surfaces and opposing each other, and fifth and sixth surfaces connected to the first and second surfaces, connected to the third and fourth surfaces, and opposing each other;
first and second side portions disposed on the fifth and sixth surfaces of the capacitor body, respectively, and having a roughness on surfaces thereof;
a first external electrode disposed on the third surface of the capacitor body, covering first parts of the first and second side portions, and connected to the first internal electrodes; and
a second external electrode disposed on the fourth surface of the capacitor body, covering second parts of the first and second side portions, and connected to the second internal electrodes,
wherein the first parts of the first and second side portions covered by the first external electrode and the second parts of the first and second side portions covered by the second external electrode have the roughness, and
the roughness of the first and second side portions is greater than a roughness of one of the third and fourth surfaces.

2. The multilayer capacitor of claim 1, wherein the first parts of the first and second side portions are covered directly by the first external electrode, and
the second parts of the first and second side portions are covered directly by the second external electrode.

3. The multilayer capacitor of claim 1, wherein the roughness (Ra) of one of surfaces of the first and second side portions is 2 to 100 nm.

4. The multilayer capacitor of claim 1, wherein the first external electrode includes:
a first connection portion disposed on the third surface of the capacitor body, and connected to the first internal electrode; and
a first band portion extending from the first connection portion to parts of the first and second side portions, and
the second external electrode includes:
a second connection portion disposed on the fourth surface of the capacitor body, and connected to the second internal electrode; and
a second band portion extending from the second connection portion to parts of the first and second side portions.

5. The multilayer capacitor of claim 4, wherein the first and second band portions have an average thickness of 10 μm or less, respectively.

6. The multilayer capacitor of claim 1, wherein the first and second side portions have an average thickness of 10 μm or less, respectively.

7. The multilayer capacitor of claim 1, wherein the capacitor body includes an active region in which the first and second internal electrodes overlap each other and upper and lower cover regions disposed on upper and lower surfaces of the active region, respectively.

8. The multilayer capacitor of claim 1, wherein each of the first and second external electrodes includes a plating layer.

9. A board having a multilayer capacitor, comprising:
a circuit board having first and second electrode pads disposed on one surface thereof; and
the multilayer capacitor of claim 1 mounted on the circuit board so that the first and second external electrodes are connected to the first and second electrode pads, respectively.

10. A multilayer capacitor comprising:
a body including a ceramic body, in which dielectric layers and first and second internal electrodes are stacked, the body having first and second surfaces opposing each other in a stacking direction of the first and second internal electrodes, third and fourth surfaces from which the first and second internal electrode are respectively exposed, and fifth and sixth surfaces opposing each other;

a first external electrode disposed on the third surface of the body and parts of the fifth and sixth surfaces, and connected to the first internal electrodes; and a second external electrode disposed on the fourth surface of the body and parts of the fifth and sixth surfaces, and connected to the second internal electrodes, wherein a roughness of one of the fifth and sixth surfaces is greater than a roughness of one of the first and second surfaces.

11. The multilayer capacitor of claim 10, wherein one of the first and second external electrodes includes a band portion covers a portion of the one of the fifth and sixth surfaces having the roughness.

12. The multilayer capacitor of claim 11, wherein the band portion has an average thickness of 10 μm or less.

13. Multilayer capacitor of claim 10, wherein the roughness (Ra) of the one of the fifth and sixth surfaces is 2 to 100 nm.

14. The multilayer capacitor of claim 10, wherein the body further includes first and second side portions respectively disposed on opposing surfaces of the ceramic body, and an outer surface of one of the first and second side portions is the one of the fifth and sixth surfaces.

15. The multilayer capacitor of claim 14, wherein one of the first and second side portions has an average thickness of 10 μm or less.

16. A board having a multilayer capacitor, comprising:

a circuit board having first and second electrode pads disposed on one surface thereof; and the multilayer capacitor of claim 10 mounted on the circuit board so that the first and second external electrodes are connected to the first and second electrode pads, respectively.

* * * * *